W. E. KERSHAW.
STORAGE BATTERY COUNTER CELL.
APPLICATION FILED DEC. 22, 1920.
1,437,470.
Patented Dec. 5, 1922.
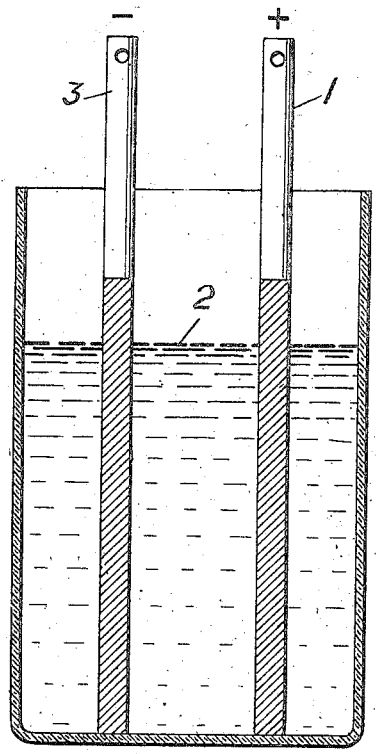
WITNESS:
INVENTOR
William Ernest Kershaw
BY
ATTORNEY.

Patented Dec. 5, 1922.

1,437,470

UNITED STATES PATENT OFFICE.

WILLIAM ERNEST KERSHAW, OF PHILADELPHIA, PENNSYLVANIA.

STORAGE-BATTERY COUNTER CELL.

Continuation of application Serial No. 324,506, filed September 18, 1919. This application filed December 22, 1920. Serial No. 432,399.

*To all whom it may concern:*

Be it known that I, WILLIAM ERNEST KERSHAW, a citizen of the United States, residing at Philadelphia, in the county of Philadelphia and State of Pennsylvania, have invented certain new and useful Improvements in Storage-Battery Counter Cells, of which the following is a specification.

This application is a renewal of my application, Serial No. 324,506, filed September 18th, 1919.

Storage battery cells, usually of little or no capacity, are frequently used to furnish counter electro-motive force, or in other words, are used in some cases instead of resistance and when used or intended for use for such purposes are called counter cells.

In use counter cells are subject to rapid deterioration and disintegration and it is the principal object of the present invention to avoid those defects and disadvantages and to provide counter cells of long life and great durability.

The drawing diagrammatically shows, principally in section, a cell intended for use as a counter cell.

In the drawing 1 is the anode or positive pole plate, and it is insoluble in the electrolyte 2, and 3 is the cathode or negative pole plate. The plate structures are preferably of lead or leaden material or lead alloy on account of the comparatively high voltage available when that material is employed, but other material or materials complying with the described conditions may be employed. The invention consists in the combination, in a counter cell, of an insoluble anode, and a depolarizing agent the operation of which is regenerative. Bichromate of potassium or its equivalent sodium salt is added to the electrolyte in the case of lead or leaden plates give approximately the same voltage as without its addition, but reduces corrosion on the anode to such an extent that the life of the cell is many times that of similar cells heretofore used as counter cells. Of course bichromate of potassium or sodium is an example of a depolarizing agent and the invention is not necessarily limited thereto. Inasmuch as the anode is insoluble, the operation of the depolarizer is regenerative; for example, the bichromate salt, which has been changed to chromic acid through the action of the sulphuric acid in the electrolyte, gives up oxygen at the cathode, this oxygen combining with the hydrogen given off at the cathode to form water, and the chromic acid is thus reduced. This reduced chromic acid coming in contact with the nascent oxygen at the anode is re-oxidized and hence is regenerated.

In the case of lead or leaden plates, the addition of approximately 3% by weight of the bichromate of sodium to sulphuric acid electrolyte of approximately 1,200 specific gravity gives excellent results.

The invention being chemical or electro-chemical I desire to state that I claim the wide range of equivalents permissible in such cases.

I claim:

1. In a cell for use as a counter cell the combination with an electrolyte and an anode insoluble in the electrolyte of a depolarizing agent, substantially as described.

2. In a lead sulphuric acid secondary cell for use as a counter cell the combination with the insoluble leaden anode of an admixture of a depolarizing agent with the sulphuric acid electrolyte, substantially as described.

3. In a counter cell the combination of an electrolyte and an anode insoluble in the electrolyte and a bichromate salt constituting a depolarizing agent, substantially as described.

4. In a counter cell the combination of a sulphuric acid electrolyte and a leaden anode and bichromate of potash constituting a depolarizing agent, substantially as described.

5. In a counter cell having a sulphuric acid electrolyte the combination of an insoluble anode and a solution of chromic acid constituting a depolarizing agent, substantially as described.

WILLIAM ERNEST KERSHAW.